United States Patent
Meng et al.

(10) Patent No.: US 12,307,654 B1
(45) Date of Patent: May 20, 2025

(54) METHODS FOR IMAGE SIMULATION, PSEUDO-RANDOM DEFECT DATASET GENERATION, AND MICRO AND NANO DEFECTS DETECTION

(71) Applicants: NANJING UNIVERSITY OF AERONAUTICS AND ASTRONAUTICS, Jiangsu (CN); SUZHOU RESEARCH INSTITUTE OF NANJING UNIVERSITY OF AERONAUTICS AND ASTRONAUTIC, Jiangsu (CN)

(72) Inventors: Kai Meng, Nanjing (CN); Junquan Zhou, Nanjing (CN); Hangying Zhang, Nanjing (CN); Chao Meng, Nanjing (CN); Peihuang Lou, Suzhou (CN); Xiaoming Qian, Nanjing (CN); Xing Wu, Nanjing (CN)

(73) Assignees: NANJING UNIVERSITY OF AERONAUTICS AND ASTRONAUTICS, Nanjing (CN); SUZHOU RESEARCH INSTITUTE OF NANJING UNIVERSITY OF AERONAUTICS AND ASTRONAUTICS, Suzhou (CN)

( * ) Notice: Subject to any disclaimer, the term of this patent is extended or adjusted under 35 U.S.C. 154(b) by 0 days.

(21) Appl. No.: 19/031,144

(22) Filed: Jan. 17, 2025

(30) Foreign Application Priority Data

Mar. 29, 2024 (CN) .......................... 202410371650.0

(51) Int. Cl.
*G06T 7/00* (2017.01)
*G06T 7/13* (2017.01)
(Continued)

(52) U.S. Cl.
CPC ................ *G06T 7/001* (2013.01); *G06T 7/13* (2017.01); *G06T 7/155* (2017.01); *G06T 15/506* (2013.01);
(Continued)

(58) Field of Classification Search
CPC ....... G06T 15/00; G06T 15/50; G06T 15/506; G06T 7/0004–001; G06T 2207/30148
See application file for complete search history.

(56) References Cited

U.S. PATENT DOCUMENTS

| 2009/0034831 | A1 | 2/2009 | Amanullah et al. |
| 2019/0163866 | A1* | 5/2019 | Liu .......................... G06F 30/20 |
| 2020/0089130 | A1* | 3/2020 | Chao ..................... G06F 30/398 |

FOREIGN PATENT DOCUMENTS

| CN | 104833679 A | 8/2015 |
| CN | 111982910 A | 11/2020 |

(Continued)

OTHER PUBLICATIONS

First Office Action in Chinese Application No. 202410371650.0 mailed on May 9, 2024, 10 pages.
(Continued)

*Primary Examiner* — Ryan McCulley
(74) *Attorney, Agent, or Firm* — Porus IP LLC

(57) ABSTRACT

The embodiments of the present disclosure provide a method for an image simulation generation based on a near-field simulation of a computational electromagnetic field, the method comprising: constructing a simulated three-dimensional model based on model parameters; constructing a simulated Kohler illumination model based on a light source parameter; using a degree of similarity change in a synthesized image under incremental aperture diaphragm sampling points as a criterion for approximate convergence of the simulation to determine a count of (Continued)

samples to be used for a balancing combination of simulation cost and accuracy; an optical simulation is performed based on the simulated three-dimensional model and the simulated Kohler illumination model, and a far-field electromagnetic field distribution data is obtained to obtain a simulated image by synthesizing the image. In the generation of a large count of simulated images on the basis of pseudo-random defect dataset generation may be further realized, in the acquisition of a large count of datasets, the dataset of defect inspection model may be trained, in order to achieve a direct detection for patterned wafer defective images and solve the problem of difficult access to reference images in a process of patterned wafer defect detection.

7 Claims, 6 Drawing Sheets

(51) Int. Cl.
  *G06T 7/155* (2017.01)
  *G06T 15/50* (2011.01)
  *G06T 17/00* (2006.01)
(52) U.S. Cl.
  CPC .... *G06T 17/00* (2013.01); *G06T 2207/20036* (2013.01); *G06T 2207/20081* (2013.01); *G06T 2207/30148* (2013.01)

(56) References Cited

FOREIGN PATENT DOCUMENTS

| | | |
|---|---|---|
| CN | 113158485 A | 7/2021 |
| CN | 113989126 A | 1/2022 |
| CN | 114359193 A | 4/2022 |
| CN | 115774055 A | 3/2023 |
| CN | 116484585 A | 7/2023 |
| JP | 2013197334 A | 9/2013 |

OTHER PUBLICATIONS

Decision to Grant a Patent in Chinese Application No. 202410371650.0 mailed on May 22, 2024, 4 pages.

Qi, Bin et al., Real-time Simulation of SAR Image of Artificial Target, Journal of System Simulation, 20(1): 186-190, 2008.

Luo, Chengfeng, Development of an Unpatterned Wafer Inspection System Based on Dark Field Scattering, Chinese Master's Theses Full-text Database Information Science and Technology Series, 2023, 65 Pages.

Liu, Yuwen et al., Research on recognition technology of low and slow target with synthetic aperture imaging, Journal of Ordnance Equipment Engineering, 43(5): 296-302, 2022.

Qiu, Defu et al., Improved Generative Adversarial Network for Retinal Image Super-Resolution, Computer Methods 6 and Programs in Biomedicine, 2022, 7 Pages.

* cited by examiner

METHODS FOR IMAGE SIMULATION, PSEUDO-RANDOM DEFECT DATASET GENERATION, AND MICRO AND NANO DEFECTS DETECTION

CROSS-REFERENCE TO RELATED APPLICATIONS

This application claims priority to Chinese application No. 202410371650.0 entitled "METHODS FOR IMAGE SIMULATION, PSEUDO-RANDOM DEFECT DATASET GENERATION, AND MICRO AND NANO DEFECTS DETECTION" filed on Mar. 29, 2024, the entire contents of which are incorporated herein by reference.

TECHNICAL FIELD

According to some embodiments of the present disclosure, the present disclosure relates to a field of integrated circuit defect detection technology, and in particular, relates to a method for image simulation, pseudo-random defect dataset generation, and micro and nano defects detection.

BACKGROUND

Defect detection in a semiconductor manufacturing process is very important, which is directly related to product quality and productivity. With the industry continues to move towards advanced processes, the impact of wafer defects on the semiconductor yield and price appears to be increasingly obvious. How to improve the yield of the semiconductor manufacturing process and realize intelligent solutions has become an urgent and challenging task to be solved.

In a design process of defect detection algorithms, a dataset containing a certain count of defects is usually used to train the model. Based on the defect dataset, machine learning algorithms may learn features from the defect dataset to achieve defect identification and classification; however, in a semiconductor field, due to diversity of semiconductor and defect characteristics, it is sometimes difficult for detection algorithm developers to obtain sufficient valid datasets. Although the preparation of multiple defect array samples can partly alleviate the problem, the data obtained by the process is limited, the price is expensive, and the types of defects designed are limited, making it difficult to efficiently support the development and innovation of machine learning algorithms.

Therefore, it is desired to provide a method for image simulation, pseudo-random defect dataset generation, and micro and nano defect detection capable of realizing rapid generation of patterned wafer defective image datasets and designing suitable machine learning algorithms to realize defective image recognition and classification.

SUMMARY

One or more embodiments of the present disclosure provide a method for an image simulation generation based on a near-field simulation of a computational electromagnetic field, wherein the method comprises: constructing, based on model parameters, a simulated three-dimensional model, the model parameters including a model material parameter, a model three-dimensional geometric structure parameter, and a model boundary computation domain; constructing, based on a light source parameter, a simulated Kohler illumination model, the light source parameter including an initial wavelength of a plane wave, a polarization amplitude of the plane wave, an angle of incidence of the plane wave, and an azimuthal angle of an incident plane wave; using a degree of similarity change in a synthesized image under incremental aperture diaphragm sampling points as a criterion for approximate convergence of the simulation to determine the count of samples to be used for a balancing combination of simulation cost and accuracy; performing an optical simulation based on the simulated three-dimensional model and the simulated Kohler illumination model, the optical simulation including simulating by a simulation environment constructed by combining the simulated three-dimensional model and the simulated Kohler illumination model and synthesizing an image by obtaining far-field electromagnetic field distribution data to synthesize an image to obtain a simulated image; wherein using the degree of similarity change in the synthesized image under incremental aperture diaphragm sampling points as a criterion for approximate convergence of the simulation to determine the count of samples to be used for balancing the combination of the simulation cost and accuracy includes: giving an initial sampling density $n_{input}$ and judgment thresholds $T_1$, $T_2$, $T^*$ for an image similarity; defining $n=n_{input}$ and increasing a sampling density sequentially according to the rule of $n=n+1$ to obtain a simulated image $I_n$ corresponding to each of different sampling densities; assessing the image similarity of the simulated image $I_n$ with adjacent simulated images $I_{n-1}$ and $I_{n-2}$ using the Structural Similarity Index Measure (SSIM) as a metric; when $SSIM(I_n, I_{n-1})>T_1$ and $SSIM(I_n, I_{n-2})>T_2$ are satisfied, determining that the current n is a sampling point when the simulated image has sufficiently converged; defining $n_0^*=n$; wherein at this time, $n_0^*$ is the sampling point when the simulated image has sufficiently converged, and the corresponding simulated image is $I_0^*$. redefining $n=n_{input}$ and increasing a sampling density sequentially according to the rule of $n=n+1$ again to obtain the simulated image $I_n$ corresponding to each of the different sampling densities; comparing the image similarity between the obtained simulated image $I_n$ with the simulated image $I_0^*$ corresponding to the convergent sampling point $n_0^*$; wherein when $SSIM(I_n, I_0^*)>T^*$, $n \leq n_0^*$, and n is an odd number are satisfied, the n is a desired optimal sampling value, and defining $n_{best}=n$ to yield the optimal sampling density $n_{best}$; calculating the Structural Similarity Index Measure (SSIM) by the following equation:

$$SSIM(I_x, I_y) = \frac{(2\mu_x\mu_y + C_1)(2\sigma_{xy} + \mu_x + C_2)}{(\mu_x^2 + \mu_y^2 + C_1)(\sigma_x^2 + \sigma_y^2 + C_2)}, \quad (1)$$

wherein $I_x$ and $I_y$ represent two images at sampling points x and y, respectively, $\mu_x$ and $\mu_y$ are averages of all pixels in the two images, $\sigma_x$ and $\sigma_y$ are grayscale standard deviations of the two images, $\sigma_{xy}$ is a covariance, and $C_1$ and $C_2$ are empirical constants; performing an optical simulation based on the simulated three-dimensional model and the simulated Kohler illumination model, by obtaining far-field electromagnetic field distribution data to synthesize an image to obtain a simulated image includes: obtaining nearfield electric filed distribution data within a computational domain of the simulated three-dimensional model by inputting light source parameters generated by the simulated Kohler illumination model into the simulated three-dimensional model for simulation; performing a Fourier analysis to obtain the far-field electromagnetic field distribution data based on the nearfield electric filed distribution data; and superimposing the nearfield electric filed distribution data and the far-field electromagnetic field distribution data with light intensity to generate the simulated image.

One or more embodiments of the present disclosure provide a method for generating a pseudo-random defect dataset based on graphical processing, and the method comprises: obtaining, based on the method of claim 1, a difference image between a flawless image and a defective image with the same substrate pattern structure; obtaining a gradient image using a Sobel operator for the difference image; performing binarization on the gradient image by setting a threshold to obtain a binarized image; obtaining a defect-affected region based on the binarized image by an image processing morphological opening and closing operation; obtaining, based on the binarized image, a minimum outer rectangle of the defect-affected region by an edge detection algorithm; and obtaining a pseudo-random defective image by superimposing the defect-affected region with the defective image and the minimum outer rectangle of the defect-affected region on the flawless image.

One or more embodiments of the present disclosure provide a method for detecting micro and nano defect in patterned wafers, and the method comprises: constructing a defect inspection model, training the defect inspection model with a dataset constructed by the method of claim 4, and realizing detection and recognition of defects in optical images of patterned wafers by the defect inspection model obtained by training.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 4(*b*) is a schematic diagram illustrating a sampling of an aperture diaphragm plane according to some embodiments of the present disclosure;

Figure 1:
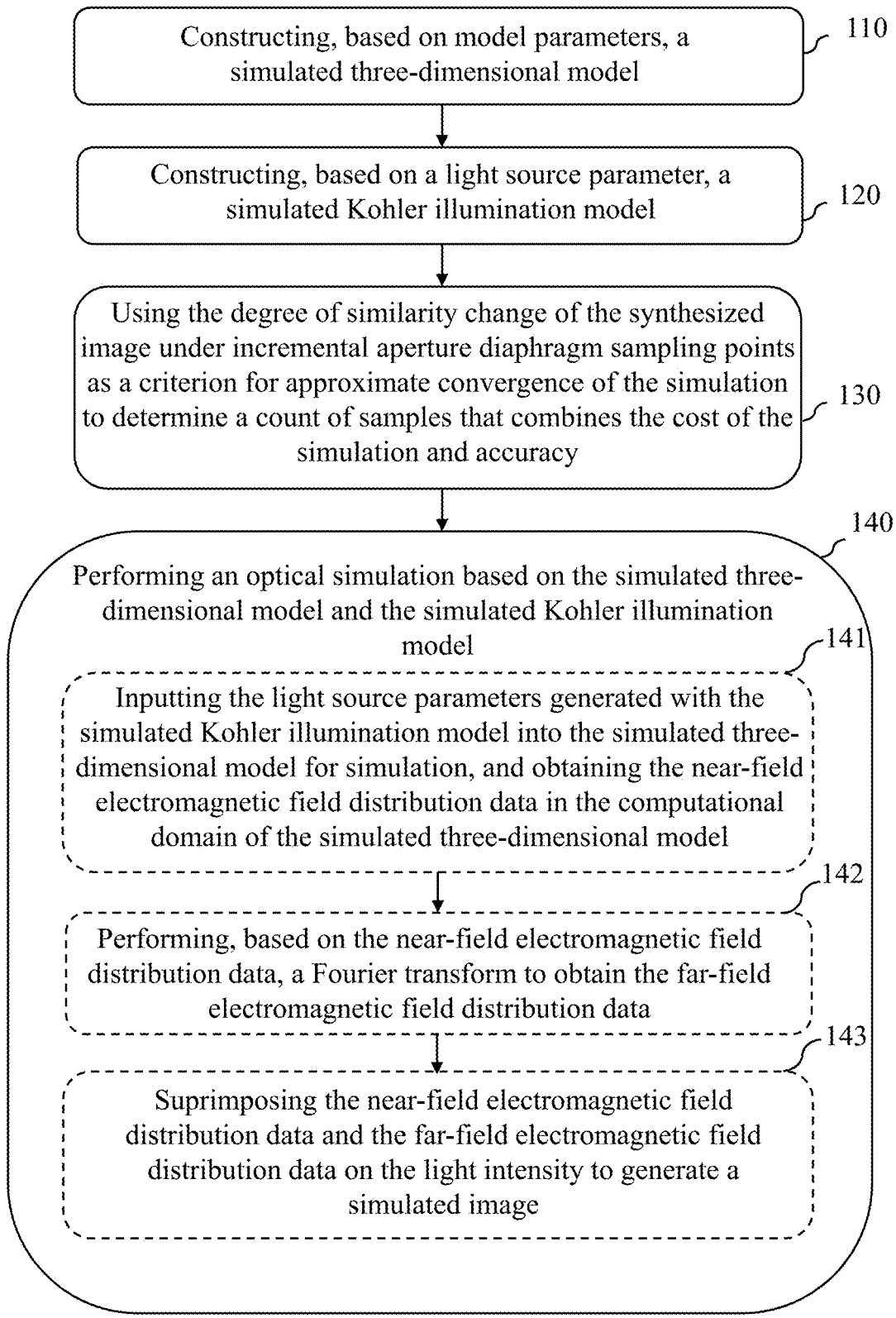
FIG. 1 is a flowchart illustrating a process for generating an image simulation based on a near-field simulation of a computational electromagnetic field according to some embodiments of the present disclosure.

Optical micro-imaging detection processes are widely used for in-line inspection due to high processing speeds. Traditionally, a reference image is required for defect recognition of a bright-field image, and a defect recognition algorithm identifies defects by comparing two images. For example, a Chinese patent publication No. CN101358935A discloses a system and a method for patterning wafer defect detection, the system includes a region system and a gold template system; the system selects a plurality of regions from a wafer through the region system, and the gold template system is utilized to generate a regional gold template for each region, and defect recognition is achieved by comparing the wafer image and the gold template; however, obtaining a reference image is not easy, and in order to solve this problem, it is hoped that defective and flawless features may be learned by a certain machine learning algorithm during algorithm design to achieve a direct recognition of defects; for example, a Chinese patent publication No. CN115774055A discloses a method, device, and system for detecting micro and nano defects inside integrated circuits; the method discloses constructing a preset defect recognition model based on a YOLOX model, which successfully realizes the automatic detection of defects in an image of an integrated circuit acoustic scanning sample.

The present disclosure provides a method for image simulation, pseudo-random defect dataset generation, and micro and nano defects detection capable of obtaining a large count of simulated images on basis of which a pseudo-random defect dataset generation may be further realized, and when obtaining a large count of datasets, a defect inspection model may be trained by the dataset to achieve direct detection of patterned wafer defective images, which solves the problem of difficult access to reference images in a process of patterned wafer defect detection.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with the accompanying drawings without creative labor. Unless obviously obtained from the context or the context illustrates otherwise, the same numeral in the drawings refers to the same structure or operation.

It should be understood that the terms "system," "device," "unit," and/or "module" as used herein is a way to distinguish between different components, elements, parts, sections or assemblies at different levels. However, the words may be replaced by other expressions if other words accomplish the same purpose.

As shown in the present disclosure and in the claims, unless the context clearly suggests an exception, the words "a," "an," "one," and/or "the" do not refer specifically to the singular but may also include the plural. Generally, the terms "including" and "comprising" suggest only the inclusion of clearly identified steps and elements that do not constitute an exclusive list, and the method or device may also include other steps or elements.

Flowcharts are used in the present disclosure to illustrate operations performed by a system in accordance with embodiments of the present disclosure. It should be appreciated that the preceding or following operations are not necessarily performed in an exact sequence. Instead, steps may be processed in reverse order or simultaneously. Also, it is possible to add other operations to these processes or remove a step or steps from them.

FIG. 1 is a flowchart illustrating a process for generating an image simulation based on a near-field simulation of a computational electromagnetic field according to some embodiments of the present disclosure.

In some embodiments, the process for generating an image simulation based on a near-field simulation of a computational electromagnetic field may be realized by a system for generating the image simulation based on the computational electromagnetic field near-field simulation.

In some embodiments, a system for generating the image simulation based on the computational electromagnetic field near-field simulation may include a processor, a memory, and an interactive screen.

The memory may store data, instructions, and/or any other information. In some embodiments, the memory may store data and/or instructions related to a method for generating the image simulation based on the near-field simulation of the computational electromagnetic field. For example, the memory may store a simulation program or the like.

In some embodiments, the memory may include a mass storage device, a removable storage device, a volatile read-write memory, a read-only memory (ROM), or any combination thereof. The exemplary mass storage may include disks, optical disks, solid state drives, or the like. In some embodiments, the storage may be implemented on a cloud platform. Merely by way of example, a cloud platform may include a private cloud, a public cloud, a hybrid cloud, a community cloud, a distributed cloud, an on-premises cloud, a multi-cloud, or any combination thereof.

The interactive screen refers to a terminal device that enables interaction between a user and a system. For example, the interactive screen may be a computer display, or the like. In some embodiments, the user may input model parameters and light source parameters via the interactive screen, and the processor may send a simulated image to the interactive screen to output a simulation result to the user.

In some embodiments, the interactive screen is communicatively connected to the processor and memory.

The processor refers to a device for executing or processing instructions and/or data obtained from a system for generating an image simulation based on a computational electromagnetic field near-field simulation. The processor may execute program instructions based on such data, information, and/or processing results to perform one or more of the functions described in this application. In some embodiments, the processor may comprise one or more sub-processing devices (e.g., a single-core processing device or a multi-core processing device). Merely by way of example, the processor may include a central processing unit (CPU), an application-specific integrated circuit (ASIC), or any combination.

In some embodiments, the processor may be configured to obtain a simulation program, a first preset program, and a second preset program from the memory and obtain model parameters and a light source parameter through the interactive screen; construct, based on the model parameters, a simulated three-dimensional model through a simulation software; construct, based on the light source parameter, a simulated Kohler illumination model through the simulation software; use a degree of similarity change in a synthesized image under sampling density increment as a criterion for approximate convergence of the simulation through the first preset program to determine an optimal sampling density; performing an optical simulation based on the simulated three-dimensional model and the simulated Kohler illumination model through the simulation software; and sending a simulated image to the interactive screen to output a simulation result.

In some embodiments, a process 100 corresponding to the method for generating the image simulation based on the near-field simulation of the computational electromagnetic field includes following steps 110-140, as shown in FIG. 1. In some embodiments, the process 100 may be executed by the processor.

In 110, constructing, based on model parameters, a simulated three-dimensional model.

In some embodiments, the processor may construct the simulated three-dimensional model based on the model parameters via a simulation program. The simulation program may be accessed by the processor from the memory.

The simulation program refers to computer software used to build the simulation model. By creating mathematical models and algorithms, the simulation program may simulate various types of systems and processes, such as physics and chemistry in a virtual environment. In the present disclosure, the simulation program is used for optical imaging.

The model parameters refer to relevant parameters required to construct the simulated three-dimensional model. In some embodiments, the processor may obtain manually the entered model parameters via the interactive screen.

In some embodiments, the model parameters may include a model material parameter, a model three-dimensional geometric structure parameter, and a model boundary computation domain.

In some embodiments, the model material parameter may include a material definition, a material code, a name, and a relative dielectric constant required for constructing the simulated three-dimensional model; the model three-dimensional geometric structure parameter may include a two-dimensional X-Y plane basic figure and height range; the model boundary computation domain may include a calculation domain of the simulated three-dimensional model and boundary conditions of the simulated three-dimensional model along six directions.

In some embodiments, the processor may construct the simulated three-dimensional model based on the model parameters via the simulation software. The simulation software may be pre-stored in the memory, and the processor may retrieve the simulation software directly from the memory. The simulation software may be COMSOL Multiphysics simulation software, Ansys Zemax simulation software, or the like.

For example, the processor may define a material file of the simulated three-dimensional model, a geometric structure file of the three-dimensional model, and a light source file in the simulation software based on the model parameters; and at the same time, define a computational domain of the simulated three-dimensional model (the optical simulation region) and the boundary conditions of the simulated three-dimensional model along six directions in the geometric structure file.

For example, the processor may define a material for the simulated three-dimensional model in the material file of the simulation software based on the model parameters: defining one material as silicon (Si) with a material code of 1, and a relative permittivity required of 3.4699 under a plane wave at a wavelength of 260 nm; and defining another material as air with a material code of 2, and a relative permittivity required of 1.

Figure 3:
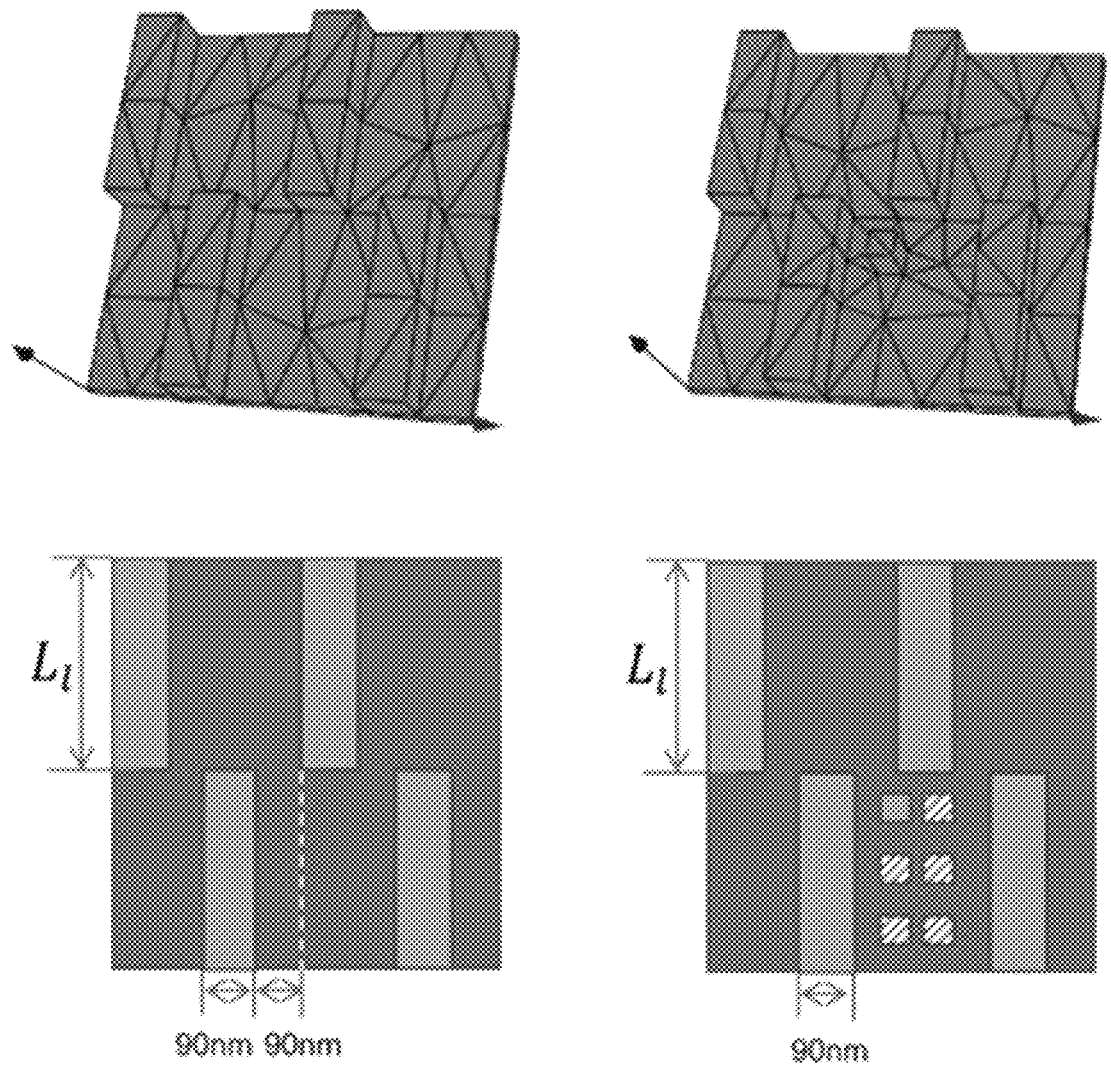
FIG. 3 is a schematic diagram illustrating a structure of a simulated three-dimensional model according to some embodiments of the present disclosure.

FIG. 3 is a schematic illustrating a structure of a simulated three-dimensional model shown according to some embodiments of the present disclosure. In some embodiments, as shown in FIG. 3, the processor may define the structure of the simulated three-dimensional model in the geometric structure file of the simulation software based on the model parameters: wherein the silicon substrate has a size of 540 nm×540 nm in the X-Y plane and a height of 90 nm in the Z-direction; the raster has a width of 90 nm in the X-Y plane, a length of 270 nm, and a height in the Z-direction of 90 nm; the defects have a size of 50 nm×50 nm in the X-Y plane and a height in the Z-direction of 90 nm; and in this process, the silicon substrate is utilized to define the computational domain of the simulated three-dimensional model (e.g., the optical simulation region) and the boundary conditions of the simulated three-dimensional model in the X-Y plane are periodic, and the boundary conditions in the height direction (Z direction) are in a transparent state.

In 120, constructing, based on a light source parameter, a simulated Kohler illumination model.

In some embodiments, the processor may construct a simulated Kohler illumination model based on the light source parameter via a simulation program. The simulation program may be accessed by the processor from memory.

In some embodiments, the processor constructs the simulated Kohler illumination model based on the light source parameter, including: obtaining, based on a basic light source parameter, a relationship equation between a position of an aperture diaphragm sampling point and a corresponding incident plane wave parameter, and obtaining, through the relational equation, incident plane wave parameters corresponding to different aperture diaphragm sampling points to construct the simulated Kohler illumination model.

The light source parameters refer to relevant parameters required to construct the simulated Kohler illumination model. In some embodiments, the light source parameter may include an initial wavelength of a plane wave, a polarization amplitude of the plane wave, an angle of incidence of the plane wave, and an azimuthal angle of an incident plane wave. The light source parameter may include a basic light source parameter and an incident plane wave parameter.

The basic light source parameter is manually uploaded to the memory via the interactive screen and retrieved by the processor. The basic light source parameter represents a light source, and the basic light source parameter include a distance from the concentrating lens to the sample, an initial azimuthal angle of the incident plane wave, an incident wavelength, and a maximum incidence angle.

The incident plane wave parameter refers to a parameter associated with the incident plane wave when it passes through the concentrating lens and hits the sample. A light source corresponds to a plurality of incident plane waves, an incident plane wave corresponds to an incident plane wave parameter, and an incident plane wave passes through a position of an aperture diaphragm sampling point, i.e., each position of the aperture diaphragm sampling point corresponds to an incident plane wave parameter. The incident plane wave parameter includes an initial azimuthal angle of the incident plane wave, an incidence angle, and a polarization amplitude. The aperture diaphragm sampling point refers to a point taken in the aperture diaphragm plane. The sample refers to an item to be identified for defect detection. For example, the sample may be a semiconductor wafer, or the like.

In some embodiments, the processor may obtain, based on the basic light source parameter and after reasonable derivation, a relationship equation between a position of an aperture diaphragm sampling point and a corresponding incident plane wave parameter combining with illumination characteristics of the Kohler illumination and a principle of incoherent plane wave superposition. The relationship equation is as follows:

$$\begin{cases} \theta = \left| \arctan \dfrac{\sqrt{\mu_p^2 + v_p^2}}{d} \right| \\ \phi = \arctan \dfrac{v_p}{\mu_p} \\ s = \sin(\phi - \psi_0) \\ p = \cos(\phi - \psi_0) \end{cases} \quad (1)$$

In the equation (1), d is a distance from the concentrating lens to the sample; $\psi_0$ is an initial azimuthal angle of the incident plane wave; and FIG. 4(b) is a schematic diagram illustrating a sampling of an aperture diaphragm plane according to some embodiments of the present disclosure. Combined with FIG. 4(b), $\mu_p$, $v_p$ are U-axis coordinates and V-axis coordinates of aperture diaphragm sampling points in an aperture diaphragm plane (i.e., U-V plane), i.e., ($\mu_p$, $v_p$) represent the aperture diaphragm sampling point position; the incident plane wave parameter corresponding to the position of the aperture diaphragm sampling point include: an azimuthal angle $\phi$ of the incident plane wave at the aperture diaphragm sampling point position, an incidence angle $\theta$, polarization amplitudes s and p; wherein a polarization direction of the aperture diaphragm sampling point is along the aperture diaphragm and forms an angle ($\phi-\psi_0$) with the horizontal direction.

In some embodiments, for any aperture diaphragm sampling point $P_i$, the incident plane wave parameter corresponding to the aperture diaphragm sampling point may be calculated by the relationship equation (1). The processor may define the relationship equation (1) in the interaction file of the simulation software to obtain the simulated Kohler illumination model.

Figure 4A:
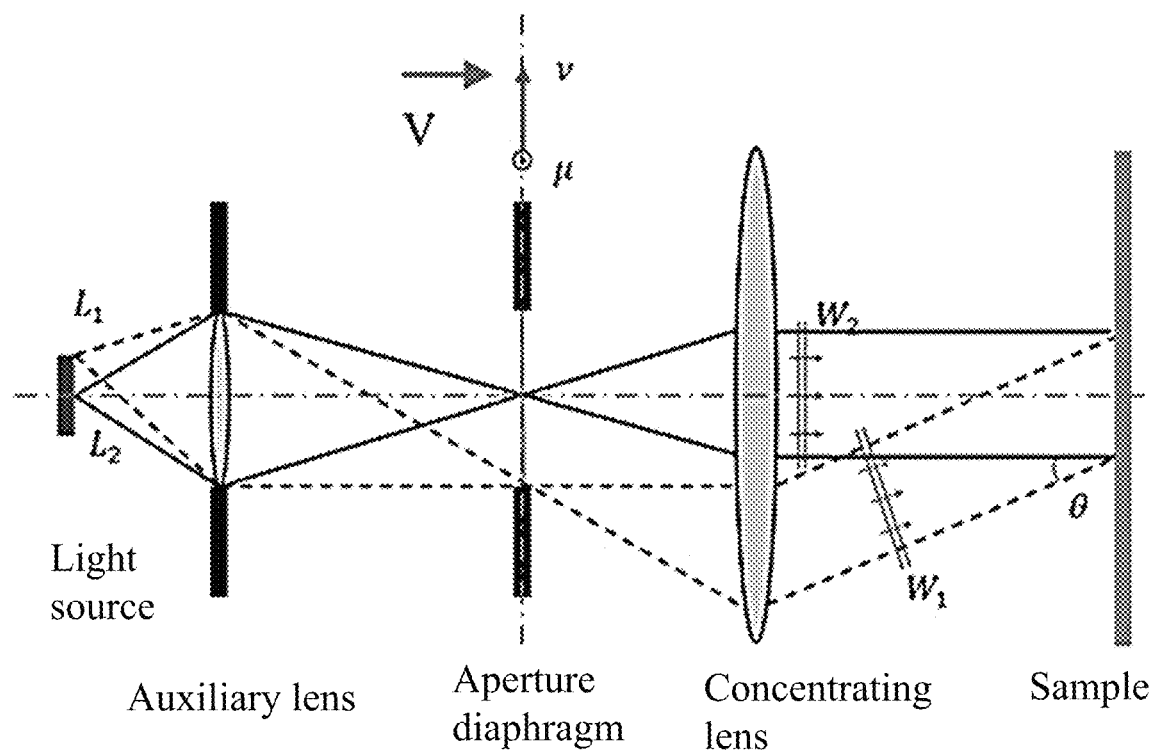
FIG. 4(*a*) is a side view illustrating a Kohler illumination light path according to some embodiments of the present disclosure.
Figure 4B:
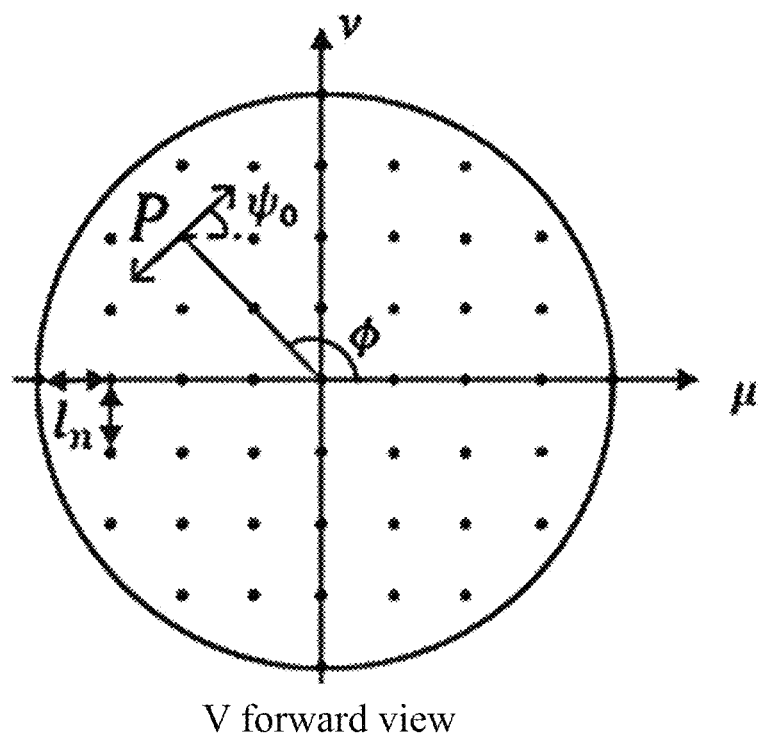

FIG. 4(a) is a side view illustrating a Kohler illumination light path according to some embodiments of the present disclosure.

In some embodiments, the processor may define the simulated Kohler illumination model according to the relationship equation (1): as shown in FIG. 4(a), the Kohler illumination model file is defined in the interactive software of the simulation software; wherein the basic light source parameter is the incident wavelength $\lambda=260$ nm, the maximum angle of incidence $\theta_{max}=60°$, and $\psi_0=0°$; and the sampling density (a count of aperture diaphragm sampling points) is determined by a simulated sampling strategy based on image similarity assessment, and the incident plane wave parameters of all aperture diaphragm sampling points are generated based on the basic light source parameter, and the simulated Kohler illumination model is generated based on the basic light source parameter and incident plane wave parameters.

In 130, using a degree of similarity change in a synthesized image under incremental aperture diaphragm sampling points as a criterion for approximate convergence of the simulation to determine a count of samples to be used for a balancing combination of the simulation cost and accuracy.

In order to balance the speed of the simulation and the imaging quality of the simulated image, the embodiments provide a sampling method based on the assessment of the image similarity to determine a suitable sampling density. The sampling density may be expressed by the count of aperture diaphragm sampling points.

In some embodiments, to assess the convergence of the sampling density corresponding to the simulation results, the processor may measure a similarity between the two simulated images based on an Image Structured Similarity Index Measure (SSIM). The SSIM may be obtained by the processor by calling a second preset program from the memory, the second preset program includes a following similarity calculation equation (2):

$$SSIM(I_x, I_y) = \frac{(2\mu_x\mu_y + C_1)(2\sigma_{xy} + C_2)}{(\mu_x^2 + \mu_y^2 + C_1)(\sigma_x^2 + \sigma_y^2 + C_2)} \quad (2)$$

In the equation (2), $I_x, I_y$ represents two simulated images when the count of aperture diaphragm sampling points are x and y, $SSIM(I_x, I_y)$ is a SSIM (i.e., image similarity) of the two simulated images $I_x, I_y, \mu_x, \mu_y$ are pixel averages of the two simulated images $I_x, I_y, \sigma_x$ and $\sigma_y$ are grayscale standard deviations of the two simulated images, $I_x, I_y$, and $\sigma_{xy}$ is a covariance; $C_1$ and $C_2$ are empirical constants, which are set by the system default settings or manually based on experience.

Figure 2:
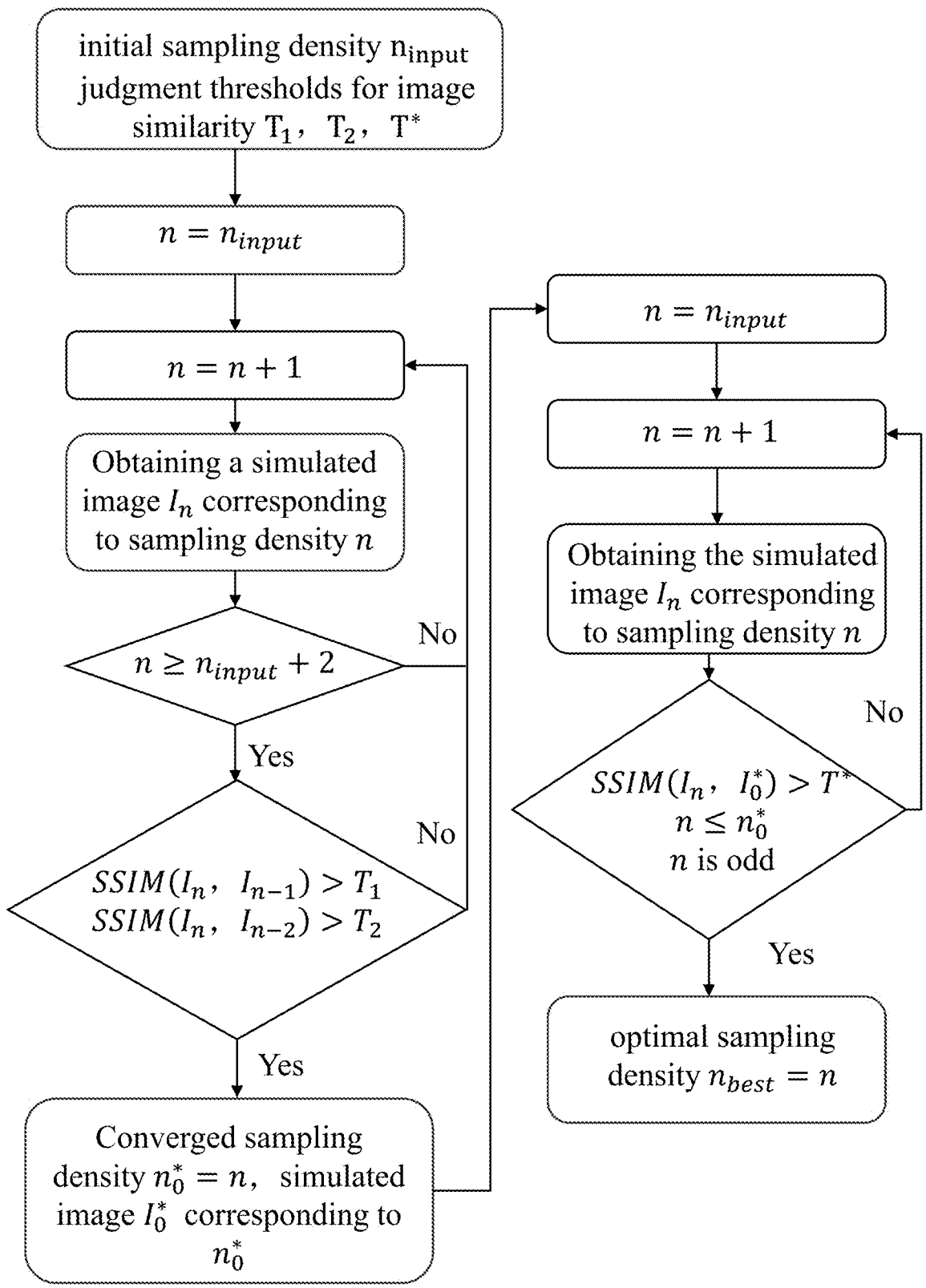
FIG. 2 is a flowchart illustrating a sampling process based on an image similarity assessment according to some embodiments of the present disclosure.

FIG. 2 is a flowchart illustrating a sampling process based on an image similarity assessment according to some embodiments of the present disclosure.

In some embodiments, the processor may use a degree of similarity change in the simulated images generated under incremental increases in sampling density as a criterion for approximate convergence of the simulation to determine an optimal sampling density by a first preset program.

The first preset program may be pre-stored in a memory, and the processor may be called directly from the memory. The optimal sampling density refers to a count of the aperture diaphragm sampling points that integrates the simulation cost and simulation accuracy. The larger the sampling density (the count of aperture diaphragm sampling points), the slower the simulation speed and the larger the simulation cost; the larger the sampling density, the higher the imaging quality of the simulated image and the higher the simulation accuracy. Simulating imaging with the optimal sampling density balances the simulation speed and the simulated image quality of the simulated image.

In some embodiments, as shown in FIG. 2, specific implementation operations of the sampling method based on the image similarity assessment are shown below:

In 301, giving an initial sampling density $n_{input}$ and judgment thresholds $T_1, T_2$, and $T^*$ for image similarity;

The judgment thresholds $T_1, T_2$, and $T^*$ refer to image similarity preset thresholds used to determine whether the simulation is nearly converged. $T_1$ is configured to determine whether the simulated image $I_n$ is similar to the simulated image $I_{n-1}$; when $SSIM(I_n, I_{n-1})>T_1$, the sampling density n is a sampling density when the image simulation converges approximately; $T_2$ is configured to determine whether the simulated image $I_n$ is similar to the simulated image $I_{n-2}$; when $SSIM(I_n, I_{n-2})>T_2$, the sampling density n is a sampling density at the approximate convergence of the image simulation; when $SSIM(I_n, I_{n-1})>T_1$ and $SSIM(I_n, I_{n-2})>T_2$, it is considered that the sampling density n is a sampling density when the image simulation is sufficiently converged at this time; $T^*$ is configured to determine whether the simulated image $I_n$ is similar with the corresponding simulated image $I_0^*$ when simulated image $I_n$ and the simulated image sufficiently converges, if $SSIM(I_n, I_0^*)>T^*$, $n \leq n_0^*$ and n is odd, the sampling density n satisfies the simulated image sufficiently converged and achieves the smallest possible value, which is an optimal sampling density that balances the simulation speed and the simulation accuracy.

In 302, defining $n=n_{input}$ and increasing a sampling density sequentially according to rule of $n=n+1$ to obtain a simulated image n corresponding to each of different sampling densities $I_n$;

In 303, assessing an image similarity of the simulated image $I_n$ with adjacent simulated images $I_{n-1}$ and $I_{n-2}$ using Structural Similarity Index Measure (SSIM) as a metric; when $SSIM(I_n, I_{n-1})>T_1$ and $SSIM(I_n, I_{n-2})>T_2$ are satisfied, determining that the current sampling density n is a sampling density when the simulated image has sufficiently converged; defining $n_0^*=n$, wherein at this time $n_0^*$ is the sampling density when the simulated image has sufficiently converged, and the corresponding simulated image is $I_0^*$;

Re-executing the operation 302;

In 304, comparing an image similarity between the obtained simulated image $I_n$ with the simulated image $I_0^*$ corresponding to the convergent sampling point $n_0^*$; wherein when $SSIM(I_n, I_0^*)>T^*$, $n \leq n_0^*$, and n is an odd number are satisfied, the n is a desired optimal sampling value, defining $n_{best}=n$ to yield the optimal sampling density $n_{best}$, and inputting the optimal sampling density $n_{best}$ into the Kohler illumination model file.

Exemplarily, the sampling density (i.e., the quantity) is determined and evaluated based on a similarity equation (2): based on an image similarity evaluation process (the process shown in FIG. 2), the image similarity is evaluated by taking $n_{input}=6$, $T_1=0.93$, $T_{2=0.98}$, and $T^*=0.90$, respectively, and the optimal sampling density $n_{best}=15$ is determined, for example, as shown in FIG. 4(b), and the optimal sampling density is input as parameters into the Kohler illumination model file.

In some embodiments, the processor may also obtain a third preset program and obtain the judgment thresholds $T_1$, $T_2$ for image similarity through the third preset program. The third preset program includes: obtaining, by the simulation program, an image generation time $I_n$ of the simulated image $t_1$ corresponding to different sampling densities n; generating, according to the different sampling density n and the corresponding image generation time $t_n$, a density-time correlation curve; generating, based on the density-time correlation curve, the judgment thresholds $T_1$ and $T_2$.

The third preset program refers to a program for determining a judgment threshold for the image similarity. In some embodiments, the third preset program may be pre-stored in the memory, and the processor may retrieve the third preset program directly from the memory.

The image generation time refers to a generation time of the simulated image. In some embodiments, a sampling density corresponds to a simulated image as well as an image generation time.

In some implementations, for each sampling density, the processor may generate a simulated image based on the sampling density by a simulation program that calculates the time used for generating the simulated image directly as the generation time for the image corresponding to the sampling density.

In some embodiments, for each sampling density, the processor may also capture a plurality of candidate image generation times corresponding to a plurality of times of generating the simulated image using the sampling density; and determining, based on the plurality of candidate image generation times, an image corresponding to the sampling density generation time.

The candidate image generation time refers to the candidate time used to determine the image generation time.

In some implementations, for each sampling density, the processor may perform, via a simulation program, an optical simulation to generate a simulated image according to the sampling density, and collect the corresponding image generation time, and determine the plurality of image generation times corresponding to the plurality of sampling densities as a plurality of candidate image generation times.

In some embodiments, for each sampling density, the processor may perform a weighted summation of the plurality of candidate image generation times, determining a weighted summation result as the image generation time corresponding to the sampling density.

In some embodiments, for each sampling density, the processor may cluster the plurality of candidate image generation times corresponding to the sampling density, determining a plurality of clusters; based on the count of candidate image generation times in each cluster, determining a weighting coefficient for each cluster; weighting, based on the weighting coefficient, the plurality of candidate image generation times, and determining the image generation time corresponding to the sampling density.

The clustering manner may include but are not limited to a K-Means clustering algorithm, a DBSCAN clustering algorithm, or the like.

In some implementations, the weighting factors for the individual candidate image generation times within the same clustering cluster are the same. For each cluster, the processor may calculate a ratio of the count of candidate image generation times included in the cluster to the count of all candidate image generation times, and determining the ratio as a weighting factor for the cluster.

In some embodiments, the processor may determine the sampling density corresponding to the image generation time by performing a weighted summation of the plurality of candidate image generation times based on the weighting factor.

According to some embodiments of the present disclosure, a plurality of candidate image generation times are clustered, which in turn determines weight coefficients of the candidate image generation times of the clusters; and based on the weight coefficients, the image generation times of the simulated images corresponding to the sampling density are determined, which is favorable to improve the robustness of the determination of the simulated image generation time.

According to some embodiments of the present disclosure, a plurality of candidate image generation times corresponding to a plurality of times of generating a simulated image are collected by using the sampling density and an image generation time for the simulated image is determined based on the plurality of candidate image generation times, which is conducive to reducing an error, improves the quality of the simulation, and thus improving the accuracy of determining the judgment threshold.

In some embodiments, the processor may generate a density-time correlation curve based on different sampling densities and corresponding image generation times. The density-time correlation curve may represent the sampling density and the vertical axis may represent the image generation time.

In some embodiments, the processor may construct a sampling density and a corresponding image generation time as a numerical value point, and if the count of the numerical value points is not less than a preset quantity threshold, all the numerical value points may be sorted in ascending order according to the sampling density, and the numerical values points are connected two by two to form a density-time correlation curve; if the count of numerical value points is less than the preset quantity threshold, all numerical value points are sorted in ascending order according to the sampling density, all numerical value points are segmented, and curve fitting is performed based on the numerical value points of each segment, respectively, to form a plurality of curve segments, and the plurality of curve segments are connected in a smooth manner to obtain a density-time correlation curve.

In some embodiments, the processor may segment all of the numerical value points in a plurality of ways. For example, the processor may evenly divide all numerical value points after sorting them in ascending order of sampling density into a predetermined count of segments. The preset quantity threshold and the count of predetermined segments may be set by default by the system or pre-set manually.

In some embodiments, the processor may construct a plurality of numerical value points based on different sampling densities and corresponding image generation times, and sort the plurality of numerical value points; determine a fluctuation magnitude of the two image generation times corresponding to two adjacent numerical value points; based on the fluctuation amplitudes corresponding to a plurality sets of two adjacent numerical value points, segment the plurality of numerical value points, and fit the plurality of numerical point segments to generate a density-time correlation curve.

In some embodiments, the fluctuation amplitude corresponding to the two adjacent numerical value points may be represented by a difference between an image generation time of the latter numerical value point minus an image generation time of the former numerical value point among the two adjacent numerical value points after sorting in ascending order of sampling density. That is, the fluctuation amplitude includes positive and negative values.

In some embodiments, the processor may segment the plurality of numerical value points based on the fluctuation amplitudes corresponding to the plurality sets of two adjacent numerical value points. A set of two adjacent numerical value points is noted as a numerical value point group, and a numerical value point group corresponds to a fluctuation amplitude.

Any two adjacent sets of numerical value points correspond to two fluctuation amplitudes:
If the latter fluctuation amplitude has an opposite sign to the previous fluctuation amplitude and there are adjacent R consecutive fluctuation amplitudes with the same sign before the previous fluctuation amplitude, and the difference between the latter fluctuation amplitude and the previous fluctuation amplitude is greater than a preset difference threshold, involved numerical value points corresponding to previous R consecutive fluctuation amplitudes with the same sign and the previous fluctuation amplitude are divided into one segment (a total of R+1 fluctuation amplitudes involving R+2 numerical value points);

If the latter fluctuation amplitude has a same sign as the previous fluctuation amplitude and there are adjacent R−2 consecutive fluctuation amplitudes with the same sign before the previous fluctuation amplitude, involved the numerical value points corresponding to the R consecutive fluctuation amplitudes with the same sign (including the aforementioned latter fluctuation amplitude and the previous fluctuation amplitude) are divided into one segment;

If the latter fluctuation amplitude has an opposite sign to the previous fluctuation amplitude while the difference between the fluctuation amplitudes is not greater than a preset difference threshold, and there are already R−2 adjacent consecutive fluctuation amplitudes with the same sign prior to the previous fluctuation amplitude, involved the numerical value points corresponding to the R consecutive fluctuation amplitudes (including the aforementioned latter fluctuation amplitude and the previous fluctuation amplitude) are divided into one segment. The R and preset difference threshold may be manually selected and set based on actual needs.

In some embodiments, for each numerical point segment formed by the segmentation, the processor may perform curve-fit on the numerical point segment with a fitting model and a fitting criterion to generate a corresponding curve segment. The plurality of curve segments generated by fitting the plurality of numerical point segments are smoothed and connected to obtain a density-time correlation curve. The fitting model may include but is not limited to a nonlinear regression model, a polynomial regression model, or the like. The fitting criteria may include but are not limited to least squares, maximum likelihood estimation, or the like.

According to some embodiments of the present disclosure, based on the fluctuation amplitude between numerical value points, the numerical value points can be reasonably segmented, avoiding that the fluctuation amplitude between consecutive numerical value points is too large resulting in an underfitting of the generated density-time correlation curves, which is conducive to improving the accuracy of the density-time correlation curve.

In some embodiments, the processor may select a numerical value point in the density-time correlation curve with a largest slope of the tangent line, and calculate a similarity between the sampling image corresponding to the numerical value point and the sampled image corresponding to the latter two numerical value points, and determine the similarity as a judgment threshold.

For example, the sampling density corresponding to the numerical value point with the largest slope of the tangent line in the density-time correlation curve is n, the corresponding sampled image is $I_n$, the sampling images corresponding to the last two numerical value points are $I_{n+1}$, $I_{n+2}$, and an image similarity $SSIM(I_n, I_{n+1})$ of $I_n$ and $I_{n+1}$, and an image similarity $SSIM(I_n, I_{n+2})$ of $I_n$ and $I_{n+2}$ are used as judgment thresholds $T_1$, $T_2$, respectively.

According to some embodiments of the present disclosure, obtaining the simulated image and the image generation time corresponding to different sampling densities based on the simulation program, thereby generating corresponding the density-time correlation curve, and generating the judgment thresholds based on the density-time correlation curve is conducive to fully considering the relationship between the sampling density and the image generation time, improving the simulation efficiency, and balancing the simulation speed and the quality of the simulated image imaging.

In some embodiments, the processor may further obtain the judgment threshold for the image similarity T* by a third preset procedure, the third preset procedure further comprises: obtaining an accuracy rate of results output by a defect inspection model based on a plurality of different training datasets of the defect inspection model, adjusting the initial judgment threshold based on the accuracy rate to determine the judgment threshold T*.

In some embodiments, the processor may train the defect inspection model based on a plurality of different training datasets and obtain an accuracy rate of the output results of the defect inspection model. The accuracy rate refers to an average of the first accuracy rate and the second accuracy rate. The initial judgment threshold may be set by default by the system or pre-set manually.

Figure 6:
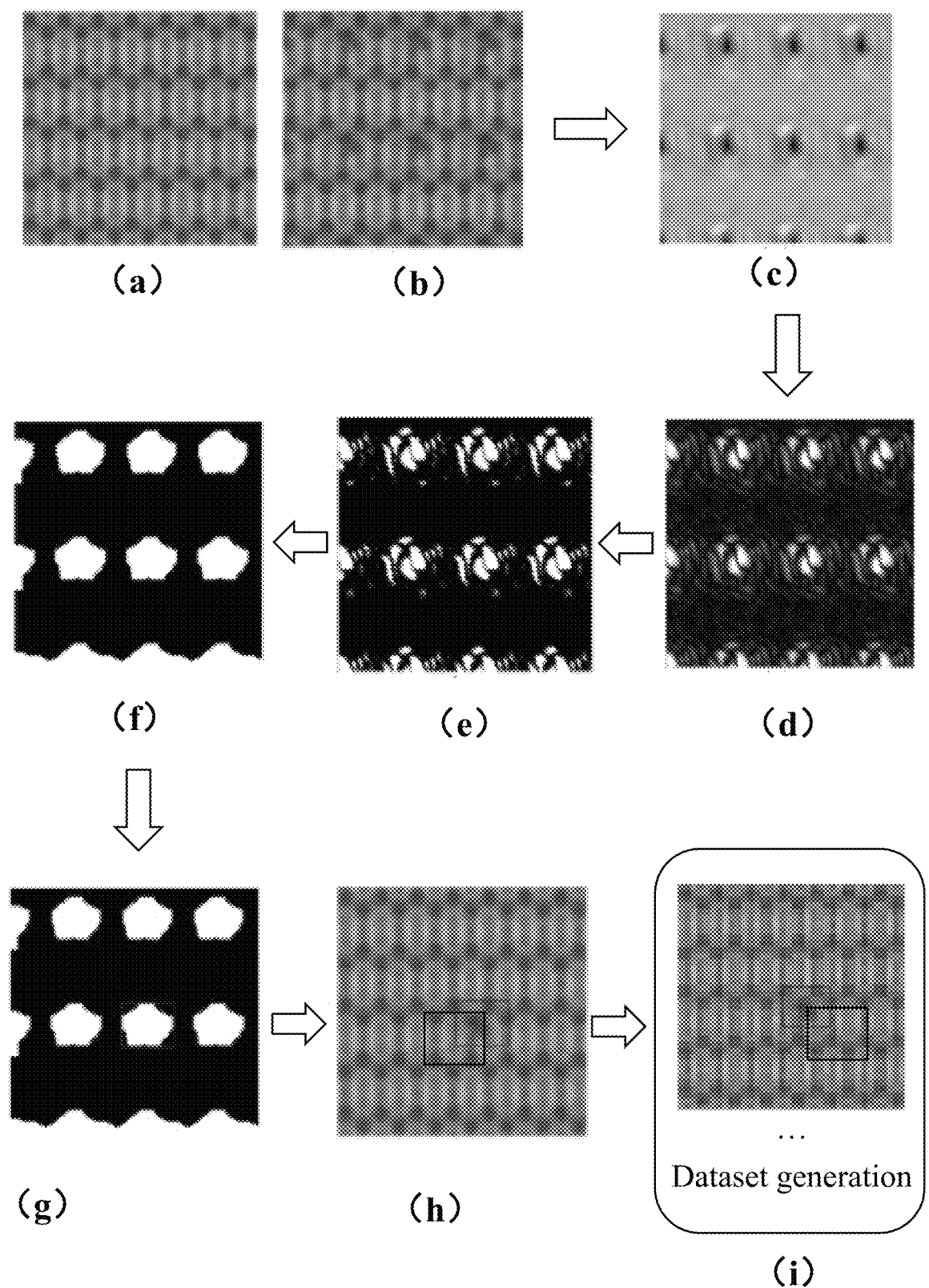
FIG. 6 is a flowchart illustrating a process for fast generation of a pseudo-random defect dataset based on graphical processing according to some embodiments of the present disclosure; wherein (a) is a schematic diagram illustrating a flawless image; (b) is a schematic diagram illustrating a defective image; (c) is a schematic diagram illustrating a difference image; (d) is a schematic diagram illustrating a gradient image; (e) is a schematic diagram illustrating a binarized image; (f) is a schematic diagram illustrating a defective image after open and close operation; (g) is a schematic illustrating a defective image labeled with a minimum outer rectangle; (h) is a schematic illustrating a single-defective image; and (i) is a schematic illustrating dataset generation.

More descriptions of the first accuracy rate, the second accuracy rate, and the defect inspection model may be found in the related description in FIG. 6.

In some embodiments, the processor may adjust an initial judgment threshold based on the accuracy rate in a plurality of ways.

For example, when the accuracy rate is less than a first predetermined threshold, the processor may increase the initial judgment threshold by a first predetermined adjustment amount, and determine the adjusted initial judgment threshold as the judgment threshold T*. The first preset threshold may be set by default by the system or pre-set manually.

In some embodiments, the first predetermined adjustment amount is negatively correlated to a maximum slope of the density-time correlation curve.

According to some embodiments of the present disclosure, adjusting an initial judgment threshold based on the accuracy of the output results of the defect inspection model, and thus determining the judgment threshold is conducive to optimizing the performance of the defect inspection model, improving accuracy of the defect inspection model for simulated image defect recognition, adapting the defect inspection model to different training datasets, and improving the generalization ability of the defect inspection model.

In 140, performing an optical simulation based on the simulated three-dimensional model and the simulated Kohler illumination model.

In some embodiments, the processor may perform an optical simulation based on the simulated three-dimensional model and the simulated Kohler illumination model through a simulation program.

Figure 5:
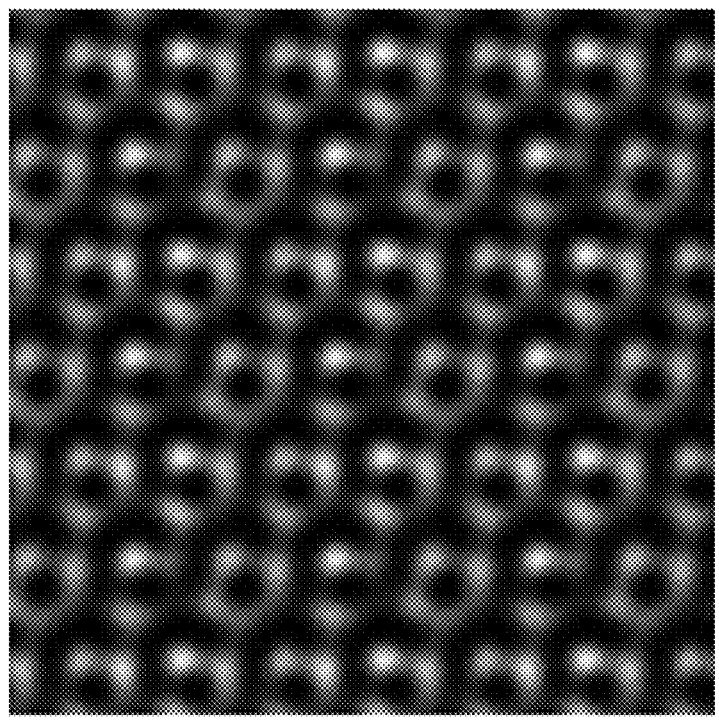
FIG. 5 is a schematic diagram illustrating a single-beam plane wave optical simulated image according to some embodiments of the present disclosure.

FIG. 5 is a schematic diagram illustrating a single-beam plane wave optical simulated image according to some embodiments of the present disclosure.

In some embodiments, as shown in FIG. 5, the optical simulation includes simulating by simulation environment constructed by combining the simulated three-dimensional model and the simulated Kohler illumination model, and synthesizing an image, by obtaining far-field electromagnetic field distribution data, to obtain a simulated image.

In some embodiments, the operation 140 may include operations 141-143.

In 141, obtaining nearfield electric filed distribution data within a computation domain of the simulated three-dimensional model by inputting light source parameters generated by the simulated Kohler illumination model into the simulated three-dimensional model for simulation.

In some embodiments, the processor may define the simulation type in a project file of the simulation software as scattering; and define the transformation of the nearfield electric filed distribution data in a post-processing file of the simulation software as a Fourier analysis.

The processor defines the cyclic simulation file based on the simulated Kohler illumination model file in the interactive software, and utilizes the simulated Kohler illumination model file to obtain all incident plane wave parameters. For a single-beam plane wave, the project file integrates the material file, the three-dimensional model file, and the light source parameter file is used for simulation to obtain the distribution of the near-field electromagnetic field in the computational domain of the three-dimensional model; and at the same time, the interactive file is used to control the repetition of the above process to realize the simulation of all incident plane waves.

In 142, performing a Fourier analysis to obtain the far-field electromagnetic field distribution data based on the nearfield electric filed distribution data.

In some embodiments, the processor may obtain far-field electromagnetic field distribution data based on the obtained nearfield electric filed distribution data using a Fourier analysis in a post-processing file.

In 143, superimposing the nearfield electric filed distribution data and the far-field electromagnetic field distribution data with light intensity to generate the simulated image.

In some embodiments, as shown in FIG. 5, the processor may repeat the above process using a cyclic simulation file, i.e., controlling the simulation output for each beam of the incident plane wave, and superimposing all the simulation outputs to obtain the simulated image.

In some embodiments of the present disclosure, constructing the simulated three-dimensional model and the simulated Kohler illumination model, and judging the simulation approximate convergence by image similarity to determine the optimal sampling density; and based on the simulated three-dimensional model and the simulated Kohler illumination model, conducting the optical simulation is conducive to making the generated simulated image more closely match the reality, and improving the simulation accuracy and realism.

Considering that in the actual simulation process, in order to reduce the amount of computation of the simulation and to speed up the simulation, the simulation adopts the simulation of periodic boundaries, but this also results in the periodic emergence of defects, which is almost impossible in the real situation, so the simulated image obtained by FIG. 1 has to be further processed to make it consistent with the real situation.

FIG. 6 is a flowchart illustrating a process for fast generation of a pseudo-random defect dataset based on graphical processing according to some embodiments of the present disclosure. In some embodiments, the process for fast generation of the pseudo-random defect dataset based on graphical processing may be performed by a processor process. The process for fast generation of the pseudo-random defect dataset based on graphical processing may include operations 610-operations 670 below.

In 610, obtaining a difference image between a flawless image and a defective image with a same substrate pattern structure.

In some embodiments, for the same substrate pattern structure with flawless and defective, the processor may obtain the flawless image and the defective image under a same light source condition by utilizing the process shown in FIG. 1 for simulation. The flawless image and the defective image are differenced, and the resulting difference image reflects the effect of the defects on the substrate structure on the scattering imaging.

As shown in FIG. 6, FIG. 6(a) and FIG. 6(b) show a flawless image $M_a$ and a defective image $M_b$ with the same substrate pattern obtained according to the simulation process described in FIG. 1, respectively, and the two images are differenced to obtain the difference image $M_c$, $M_c=M_a-M_b$ shown in FIG. 6(c).

In 620, obtaining a gradient image using a Sobel operator for the difference image.

In some embodiments, the intensities and positivity and negativity polarity of individual pixels in the difference image tend to be different, making it more difficult to extract the location of the defect directly using a threshold judgment. Thus, the processor may employ the Sobel operator to compute the gradient of the difference image. The Sobel operator solves for the relationship between changes in image pixel values, i.e., it is possible to characterize the rate of change of the image due to defects, independent of image pixel properties. Let the gradient obtained by the Sobel operator be S(M), then the difference image $M_c$ in the x and y directions with gradient information $S_x(M_c)$ and $S_y(M_c)$. Here, homogenization is configured to obtain the overall gradient information of different image pixels.

As shown in FIG. 6, the Sobel operator is applied to the difference image $M_c$ shown in FIG. 6(c) to obtain the gradient image $M_d$: $M_d=0.5[S_x(M_c)+S_y(M_c)]$ shown in FIG. 6(d).

In 630, performing binarization on the gradient image by setting a threshold to obtain a binarized image.

In some embodiments, after obtaining the gradient image by the Sobel operator, the processor may set a threshold value to realize binarization of the gradient image by a fourth preset program to obtain a region where the change of the image is relatively strong. The fourth preset program is pre-stored in the memory, and the processor may call the fourth present program directly from the memory. The fourth preset program includes a pixel value calculation equation (3):

$$M_e(x, y) = \begin{cases} 0, M_d(x, y) < T_t \\ 255, M_d(x, y) \geq T_t \end{cases}, T_t = \epsilon[M_d(x, y)_{max}] \quad (3)$$

In the equation (3), $T_t$ is a binarization threshold, defining $T_t$ linearly and positively correlated with a maximum value of pixels in the gradient image $M_d$, i.e., $T_t=\epsilon[M_d(X,Y)_{max}]$, $0<\epsilon<1$, $\epsilon$ is an empirical value determined according to the defect signal strength, $M_d(x,y)_{max}$ is a maximum value of image gradient value, $M_e(x,y)$ is a pixel value of binarized image.

As shown in FIG. 6, making $\epsilon=0.4$, binarize the gradient image $M_d$ shown in FIG. 6(d) by setting the threshold value to obtain the binarized image $M_e$ shown in FIG. 6(e).

In 640, obtaining a defect-affected region based on the binarized image by an image processing morphological opening and closing operation.

In some embodiments, due to a large count of burr points in the obtained binarized image, the processor may connect and remove the burr points from the adjacent silos in the binarized image by employing an open and close operation of image processing morphology. The kernel function and iteration rounds of the open and close operation are selected according to the actual situation.

As shown in FIG. 6, the binarized image $M_e$ shown in FIG. 6(e) performs two rounds of open and closed operations with different count of iteration rounds using kernel functions with different morphology such as 7×7 and 3×3 to obtained an image Mf shown in FIG. 6(f), wherein the closed region is the defect-affected region of interest.

In 650, obtaining, based on the binarized image, a minimum outer rectangle of the defect-affected region by an edge detection algorithm.

In some embodiments, the processor may obtain the minimum outer rectangle of all closed regions in the binarized image by an edge detection process commonly used in the image processing field. Since the image generated during simulation contains periodic defect information, the binarized image may also contain periodic closed region. Taking into account the need to avoid selecting truncated edge defects, the minimum outer rectangle of the closed region that is closest to the center of the image is selected here.

As shown in FIG. 6, the minimum outer rectangle of the closed region nearest to the center of the image $R_c$ (e.g., the rectangle shown in FIG. 6(g)) may be obtained by applying the commonly used edge detection algorithm to the image Mf shown in FIG. 6(f).

In 660, obtaining a pseudo-random defective image by superimposing the defect-affected region with the defective image and the minimum outer rectangle of the defect-affected region on the flawless image.

In some embodiments, the processor may superimpose, by a fifth preset program, the defect-affected region corresponding to the minimum outer rectangle on the flawless image to obtain a pseudo-random defective image that excludes redundant periodic defects. The fifth preset program is pre-stored in the memory, and the processor may recall the fifth program directly from the memory. The fifth preset program includes a pseudo-random defective image acquisition equation (4):

$$M_h(x, y) = \begin{cases} M_a(x, y), (x, y) \in R_c \\ M_b(x, y), (x, y) \notin R_c \end{cases} \quad (4)$$

In the equation (4), $M_h(x,y)$ is the pseudo-random defective image that excludes redundant periodic defects, $M_a(x,y)$ is an image inside the minimum outer rectangle, $M_b(x,y)$ is an image outside the minimum outer rectangle, (x,y) is an image pixel position coordinate, and $R_c$ is the minimum outer rectangle.

As shown in FIG. 6, after obtaining the minimum outer rectangle, the defect-affected region corresponding to the minimum outer rectangle $R_c$ in FIG. 6(g) is superimposed on the corresponding region of the flawless image $M_a$ shown in FIG. 6(a) to obtain the pseudo-random single-defective image $M_h$ shown in FIG. 6(h). It should be noted that, in order to be close to the imaging principle in reality, the simulation usually adopts the parameter setting that the pixel resolution of the imaging is higher than the pixel resolution of the real imaging. Taking into account the resolution of the microscope, the pseudo-random single-defective image $M_h$ may be scaled here to match the imaging system; and then the corresponding noise may be added according to the actual inspection device situation for other processing.

In 670, repeating the operations 610-660 for different defective-structure simulation patterns to obtain a dataset synthesized by the simulation patterns corresponding to the different structures together with the image regions corresponding to the defects.

Combined with FIG. 6, as shown in FIG. 6(i), the simulation patterns with different defects may be obtained by repeating the operation 610-660 as described above to form a dataset, and m=260 is a total count of simulation pattern samples.

In some embodiments, the processor may superimpose a plurality of defect-affected regions corresponding to a plurality of minimum outer rectangles on the flawless image to obtain a pseudo-random multi-defects image; generate a plurality of different training datasets based on the pseudo-random defective image, the pseudo-random multi-defects image, and/or the real defective image; and train the defect inspection model based on the plurality of different training datasets.

In some embodiments, the processor may obtain, by the edge detection process of the operation 650, a minimum outer rectangle of all closed regions in the binarized image, select a plurality of minimum outer rectangles, and, by the operation 660 described above, superimpose the plurality of minimum outer rectangles corresponding to the plurality of defect-affected regions simultaneously on the flawless image to obtain a pseudo-random image including the plurality of defects, i.e., a pseudo-random multi-defects image.

The real defective image refers to an image where a defect really exists.

In some embodiments, the processor may obtain a real defective image uploaded by the user via an interactive screen.

In some embodiments, the processor may divide sample defective images into different training datasets based on the count of image defects. The sample defective images include the pseudo-random single-defective image, the pseudo-random multi-defects image, and the real defective image.

The count of image defects refers to a count of defects included in the defective image. For a pseudo-random single-defective image, the count of image defects is 1; for a pseudo-random multi-defects image, the count of image defects is a count of the minimum outer rectangles in the pseudo-random multi-defects image; for a real defective image, the count of image defects may be labeled manually.

In some embodiments, the processor may divide sample defective images with the same count of image defects into a same training dataset, i.e., sample defective images with different numbers of image defects in different training datasets.

In some embodiments, different training datasets correspond to different learning rates, and the learning rate of the training dataset is positively correlated with an average of the count of image defects of all sample defective images included in the training dataset.

The learning rate refers to a parameter that controls a size of the step size when the model parameters are updated during model training, which determines a magnitude of the parameter update along the direction where the loss function decreases the fastest during the training of the defect inspection model by gradient descent (or other optimization algorithms).

In some embodiments, for each training dataset, the processor may determine the count of sample defective images included in the training dataset, which is denoted as the count of samples; and add the same count of sample flawless images to the training dataset.

The defect inspection model refers to a model that detects whether a simulated image is a defective image. In some embodiments, the defect inspection model may be a machine learning model, e.g., a Convolutional Neural Networks (CNN) model, a Deep Learning Neural Networks (DNN) model, or the like.

In some embodiments, an input of the defect inspection model may be a simulated image, and an output of the defect inspection model may be a defect detection result of the simulated image. The defect detection result includes 0 and 1, 0 indicates that the simulated image is a flawless image and 1 indicates that the simulated image is a defective image.

In some embodiments, the processor may train the defect inspection model based on a plurality of different training datasets according to learning rates corresponding to the training datasets. The training labels corresponding to the training samples may be labeled manually. The label corresponding to the sample flawless image is 0, and the label corresponding to the sample defective image is 1.

In some embodiments, the processor may input the training samples into the initial defect inspection model, construct a loss function based on the defect detection results output from the initial defect inspection model, update the initial defect inspection model based on the loss function, and obtain a trained defect inspection model when the preset condition is met. The preset condition may be that the loss function converges, the count of iterations reaches a preset threshold, or the like.

In some embodiments of the present disclosure, by generating pseudo-random multi-defects images and generating a plurality of different training datasets based on the plurality of defective images, the defect inspection model is trained, which is conducive to improving the generalization ability and robustness of the defect inspection model, thus enhancing the ability of the defect inspection model to detect defective images.

In some embodiments, the processor may periodically obtain a first accuracy rate and a second accuracy rate of the output results of the defect inspection model before the defect inspection model converges, and based on the first accuracy rate and the second accuracy rate, adjust a learning rate of the defect inspection model.

In some embodiments, cycle lengths for obtaining the first accuracy rate and the second accuracy rate may be negatively correlated to an average of the first difference and the second difference. The first difference refers to a difference between the first accuracy rate and a second predetermined threshold, and the second difference refers to a difference between the second accuracy rate and the second predetermined threshold. The second predetermined threshold may be manually pre-set based on a priori experience.

The first accuracy rate refers to accuracy of the training output of the positive sample. The positive sample refer to a flawless image where the samples are free of defects, i.e., the first accuracy rate may refer to an accuracy rate of a model's output result when the positive samples are fed into the defect inspection model.

In some embodiments of the present disclosure, in the process of training the defect inspection model using the plurality of training datasets, the processor may input the positive sample into the model for training as a positive sample event, mark an event that inputs the positive sample and outputs a defect detection result of 0 as a positive sample true event, marking an event that inputs the positive sample and outputs defect a detection result of 1 as a positive sample false event; count a proportion of the positive sample true event to the positive sample event in each training dataset, denoted as a first proportion; and calculating an average of the plurality of first proportions corresponding to the plurality of training datasets, which is determined to be a first accuracy rate.

The second accuracy rate refers to the accuracy of the training outputs for negative samples. The negative samples refer to defective images, i.e., the second accuracy rate may refer to the accuracy rate of the model's output result when negative samples are fed into the defect inspection model.

In some embodiments of the present disclosure, in the process of training the defect inspection model using the plurality of training datasets, the processor inputs the negative sample into the model for training as the negative sample event, marks an event that inputs of the negative sample and outputs the defect detection result of 1 as a negative sample true event, marking an event that inputs the negative sample and outputs the defect detection result of 0 as a negative sample false event; counts a proportion of the negative sample true event to the negative sample event in each training dataset, denoted as a second proportion; and calculating an average of the plurality of second proportions corresponding to the plurality of training datasets, which is determined to be a second accuracy rate.

In some embodiments of the present disclosure, in response to the first accuracy rate and/or the second accuracy rate being less than a second predetermined threshold, the processor may reduce the learning rate of the defect inspection model by a second predetermined adjustment amount and train the defect inspection model according to the adjusted learning rate.

The second predetermined adjustment amount refers to the amount of adjustment of the learning rate. In some embodiments of the present disclosure, the second predetermined amount of adjustment may be positively correlated to the count of training datasets.

In some embodiments of the present disclosure, periodically obtaining the first accuracy rate and the second accuracy rate, and thereby periodically adjusting the learning rate of the defect inspection model is conducive to rapid and sufficient training of the defect inspection model, thereby improving the training effect of the defect inspection model.

Some embodiments of the present disclosure provide a method for detecting micro and nano defects in patterned wafers, the method comprises: constructing a defect inspection model, training the defect inspection model with a dataset constructed by the method described in FIG. 6, and through the defects obtained by the training defect inspection model realizing the detection and identification of defects in the optical image of the patterned wafer.

Exemplarily, for the dataset constructed in FIG. 6, an end-to-end detection recognition model (e.g., an initial defect inspection model) based on YOLO-v8 is built in the environment of PyTorch 2.0.0; the model includes a backbone feature extraction network based on the CSPDarknet architecture, a multi-scale feature map fusion network based on the PAN-FPN, and a predictive feature network based on the decoupled predictive head network; and in a construction stage of the model, channel cropping is performed to make the detection and recognition model available for grayscale maps.

Mosaic data augmentation is performed for the dataset.

The CBAM attention mechanism is added to the model to make the network pay more attention to the defect region; the model's ability to detect and recognize defects is improved.

When the model is trained, the weights after pre-training with a dataset such as COCO2017 are applied on the backbone and re-trained without freezing the weights.

At the beginning of the training of the model, the input image is up-sampled, and its size is set to 640×640×1; according to the experimental results, a better convergence may be obtained when the learning rate of the model is 0.002 and the count of training rounds is 2,000; of which the mAP50 index may reach 90% and the mAP50-95 index may reach 40%, proving the feasibility of using deep learning algorithms for direct end-to-end detection of patterned wafer images as well as the intelligent detection technology based on deep learning as a promising solution to realize efficient defect detection.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the specification uses specific words to describe embodiments of the specification. Such as "an embodiment," "an embodiment," and/or "some embodiments" means a feature, structure, or characteristic associated with at least one embodiment of the present disclosure. Accordingly, it should be emphasized and noted that "one embodiment" or "one embodiment" or "an alternative embodiment" in different places in the present disclosure do not necessarily refer to the same embodiment. In addition, certain features, structures, or characteristics of one or more embodiments of the present disclosure may be suitably combined.

In addition, unless expressly stated in the claims, the order of the processing elements and sequences, the use of numerical letters, or the use of other names as described herein are not intended to qualify the order of the processes and methods of the present disclosure. While some embodiments of the invention that are currently considered useful are discussed in the foregoing disclosure by way of various examples, it should be appreciated that such details serve only illustrative purposes, and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group a plurality of features together in a single embodiment, accompanying drawings, or a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers to describe the count of components, attributes, and it should be understood that such numbers used in the description of the embodiments are modified in some examples by the modifiers "about," "approximately," or "substantially." Unless otherwise noted, the terms "about," "approximate," or "approximately" indicates that a ±20% variation in the stated number is allowed. Correspondingly, in some embodiments, the numerical parameters used in the specification and claims are approximations, which approximations are subject to change depending on the desired characteristics of individual embodiments. In some embodiments, the numerical parameters should take into account the specified count of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions, and/or use of terms in the present disclosure shall control.

Finally, it should be understood that the embodiments described herein are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for an image simulation generation based on a near-field simulation of a computational electromagnetic field, wherein the method comprises:
   constructing, based on model parameters, a simulated three-dimensional model, the model parameters including a model material parameter, a model three-dimensional geometric structure parameter, and a model boundary computation domain;
   constructing, based on a light source parameter, a simulated Kohler illumination model, the light source parameter including an initial wavelength of a plane wave, a polarization amplitude of the plane wave, an angle of incidence of the plane wave, and an azimuthal angle of an incident plane wave;
   using a degree of similarity change in a synthesized image under incremental aperture diaphragm sampling points as a criterion for approximate convergence of the simulation to determine a count of samples to be used for a balancing combination of simulation cost and accuracy;
   performing an optical simulation based on the simulated three-dimensional model and the simulated Kohler illumination model, the optical simulation including simulating by simulation environment constructed by combining the simulated three-dimensional model and the simulated Kohler illumination model and synthesizing an image, by obtaining far-field electromagnetic field distribution data to synthesizing an image to obtain a simulated image;

wherein the using the degree of similarity change in the synthesized image under incremental aperture diaphragm sampling points as a criterion for approximate convergence of the simulation to determine a count of samples to be used for balancing the combination of the simulation cost and accuracy includes:

giving an initial sampling density $n_{input}$ and judgment thresholds $T_1$, $T_2$, $T^*$ for an image similarity;

defining $n=n_{input}$ and increasing a sampling density sequentially according to rule of $n=n+1$ to obtain a simulated image $I_n$ corresponding to each of different sampling densities;

assessing an image similarity of the simulated image $I_n$ with adjacent simulated images $I_{n-1}$, and $I_{n-2}$ using the Structural Similarity Index Measure (SSIM) as a metric; when SSIM $(I_n, I_{n-1})>T_1$ and SSIM $(I_n, I_{n-2})>T_2$ are satisfied, determining that the current n is a sampling point when the simulated image has sufficiently converged; defining $n_0^*=n$; wherein at this time, $n_0^*$ is the sampling point when the simulated image has sufficiently converged, and the corresponding simulated image is $I_0^*$;

redefining $n=n_{input}$ and increasing a sampling density sequentially according to the rule of $n=n+1$ again to obtain the simulated image $I_n$ corresponding to each of different sampling densities;

comparing an image similarity between the obtained simulated image $I_n$ with the simulated image $I_0^*$ corresponding to the convergent sampling point no; wherein when SSIM $(I_n, I_0^*)>T^*$, $n \leq n_0^*$, and n is an odd number are satisfied, the n is a desired optimal sampling value, and defining $n_{best}=n$ to yield the optimal sampling density $n_{best}$;

calculating the Structural Similarity Index Measure (SSIM) by a following equation:

$$SSIM(I_x, I_y) = \frac{(2\mu_x\mu_y + C_1)(2\sigma_{xy} + \mu_x + C_2)}{(\mu_x^2 + \mu_y^2 + C_1)(\sigma_x^2 + \sigma_y^2 + C_2)}, \quad (1)$$

wherein $I_x$ and $I_y$ represent two images at sampling points x and y, respectively, $\mu_x$ and $\mu_y$ are averages of all pixels in the two images, $\sigma_x$ and $\sigma_y$ are grayscale standard deviation of the two images, $\sigma_{xy}$ is a covariance, and $C_1$ and $C_2$ are empirical constants;

performing an optical simulation based on the simulated three-dimensional model and the simulated Kohler illumination model, by obtaining far-field electromagnetic field distribution data to synthesizing an image to obtain a simulated image includes:

obtaining near-field electric field distribution data within a computational domain of the simulated three-dimensional model by inputting light source parameters generated by the simulated Kohler illumination model into the simulated three-dimensional model for simulation;

performing a Fourier analysis to obtain the far-field electromagnetic field distribution data based on the near-field electric field distribution data; and superimposing the near-field electric field distribution data and the far-field electromagnetic field distribution data with light intensity to generate the simulated image.

2. The method of claim 1, wherein the model material parameter includes a material definition, a material code, a material name, and a relative permittivity required for constructing the simulated three-dimensional model;

the model three-dimensional geometric structure parameter includes a two-dimensional X-Y plane basic figure and a height range; and the model boundary computation domain includes a computational domain of the simulated three-dimensional model and boundary conditions of the simulated three-dimensional model along six directions.

3. The method of claim 1, wherein the constructing, based on the light source parameter, the simulated Kohler illumination model, includes:

obtaining a relationship equation between a position of an aperture diaphragm sampling point and a corresponding plane wave parameter based on the light source parameter, obtaining a parameter of an incident plane wave corresponding to the sampling point through the relationship equation, and constructing the simulated Kohler illumination model;

wherein the relationship equation is:

$$\begin{cases} \theta = \left|\arctan\frac{\sqrt{\mu_p^2 + v_p^2}}{d}\right| \\ \phi = \arctan\frac{v_p}{\mu_p} \\ s = \sin(\phi - \psi_0) \\ p = \cos(\phi - \psi_0) \end{cases} \quad (2)$$

wherein $\theta$ is an incidence angle, $\psi_0$ is an initial azimuthal angle of the incident plane wave, $\phi$ is an azimuthal angle of the incident plane wave at the position of the aperture diaphragm sampling point, d is a distance of a concentrating lens to a sample, $\mu_p$, $v_p$ are coordinates of points taken on an aperture diaphragm plane, s and p are polarization amplitudes of the points $\mu_p$ and $v_p$, respectively.

4. A method for generating a pseudo-random defect dataset based on graphical processing, and the method comprises:

obtaining, based on the method of claim 1, a difference image between a flawless image and a defective image with a same substrate pattern structure;

obtaining a gradient image using a Sobel operator for the difference image;

performing binarization on the gradient image by setting a threshold to obtain a binarized image;

obtaining a defect-affected region based on the binarized image by an image processing morphological opening and closing operation;

obtaining, based on the binarized image, a minimum outer rectangle of the defect-affected region by an edge detection algorithm; and obtaining a pseudo-random defective image, by superimposing the defect-affected region with the defective image and the minimum outer rectangle of the defect-affected region on the flawless image.

5. The method of claim 4, wherein the performing binarization on the gradient image by setting the threshold to obtain the binarized image is represented as:

$$M_e(x, y) = \begin{cases} 0, & M_d(x, y) < T_t \\ 255, & M_d(x, y) \geq T_t \end{cases}, T_t = \epsilon[M_d(x, y)_{max}] \quad (3)$$

wherein $T_t$ is a binarization threshold, $T_t$ is linearly and positively correlated with a maximum value of pixels in a gradient image $M_d$, $\epsilon$ is an empirical value determined based on a defect signal intensity, $0<\epsilon<1$, $M_d(x,y)$ is an image gradient value, $M_d(x,y)_{max}$ is a maximum of the image gradient value, and $M_e(x,y)$ is a pixel value of the binarized image.

6. The method of claim 4, including:

obtaining the pseudo-random defective image by the following equation:

$$M_h(x, y) = \begin{cases} M_a(x, y), (x, y) \in R_c \\ M_b(x, y), (x, y) \notin R_c \end{cases} \quad (4)$$

wherein $M_h(x,y)$ represents a pseudo-random defective image with extraneous periodic defects removed, $M_a(x,y)$ represents an image within the minimum outer rectangle, $M_b(x,y)$ represents an image outside the minimum outer rectangle, $(x,y)$ is a pixel coordinate of the image, and $R_c$ is a defect minimum outer rectangle.

7. A method for detecting micro and nano defects in patterned wafers, and the method comprises:

constructing a defect inspection model, training the defect inspection model with a dataset constructed by the method of claim 4, and realizing detection and recognition of defects in optical images of patterned wafers by the defect inspection model obtained by training.

* * * * *